3,154,378
PROCESS FOR PREPARING URANIUM
MONOCARBIDE
Alfred Schneider, Leslie Burris, Jr., and Stephen Lawroski, Naperville, Ill., assignors to the United States of America as represented by the United States Atomic Energy Commission
No Drawing. Filed Aug. 25, 1961, Ser. No. 134,059
7 Claims. (Cl. 23—14.5)

This invention deals with the production of binary actinide and lanthanide rare earth metal compounds, such as carbides, silicides, borides, nitrides and sulfides and in particular with the production of uranium carbide, uranium silicide, uranium boride, plutonium carbide, lanthanide rare earth carbides, and mixtures thereof. The invention also deals with the separation of lanthanide rare earth metal values from actinide values by a selective carbide formation of the actinides.

It has been rather difficult heretofore to produce the above binary compounds. The synthesis of these compounds from the metal and the nonmetallic component in elemental form required very high temperatures and consequently reaction vessels of expensive heat-resistant materials. Also, the syntheses from the elements had to be carried out as noncontinuous batch processes. In order to obtain uranium monocarbide from a mixture of uranium metal and carbon, for instance, the mass had to be heated to a temperature of above 1000° C.

Another procedure used heretofore is the reduction of uranium oxide with carbon, but it required similarly high temperatures. Uranium metal has also been subjected to the reaction with methane for the purpose of the carbide preparation.

For the production of plutonium carbide, plutonium metal and carbon were reacted; this process had to be carried out at a temperature of 1550° C. All these methods used heretofore resulted in nonuniform products, namely a mixture of several carbides. Higher carbides were almost always present, or else the products contained unreacted metal, oxides and carbon.

Uranium monocarbide and plutonium carbide are suitable refractory materials for use as fuel in nuclear reactors. They contain a higher percentage of uranium and plutonium, respectively, than do the oxides, so that the reactor using these fuels can be built smaller. Also, the carbides have a substantially higher thermal conductivity than the oxides. It is obvious that the monocarbides have a higher uranium content yet than, for instance, the dicarbides. For all these reasons carbides are preferred to oxides and again monocarbides to higher carbides. The same is true for actinide silicides which also are a very desirable fuel material for nuclear reactors. Plutonium and uranium borides have the advantage of simultaneously containing the fuel and a component, boron, of a high neutron-capture cross section, a control material. Some lanthanide borides, e.g. gadolinium boride, europium boride, samarium boride, are excellent control materials for nuclear reactors due to their high thermal-neutron-capture cross section of both the metallic and the nonmetallic component.

It is an object of this invention to provide a process for the preparation of actinide and lanthanide carbides, silicides, borides, nitrides and sulfides which can be carried out at comparatively low temperatures so that less expensive equipment material can be used.

It is also an object of this invention to provide a process for the preparation of actinide carbides in which the use of an excessive amount of carbon over that stoichiometrically required does not result in the formation of a carbide higher than that desired and which thus yields a product of high purity.

It is a further object of this invention to provide a process for producing actinide metal carbides in which the product as it is formed separates immediately from the reagents so that undesired side reactions and ensuing contamination cannot take place.

It is finally also an object of this invention to provide a process for the production of actinide and/or lanthanide carbides, silicides, borides, nitrides and sulfides that can be carried out in a continuous manner.

These and other objects are accomplished by dissolving the actinide and/or lanthanide metal in a molten "solvent metal," preferably at a temperature of between 500 and 850° C.; introducing finely divided nonmetal, such as carbon, silicon, boron, nitrogen or sulfur into the molten metal solution formed, whereby the metal reacts with the nonmetal and a binary compound forms; and separating the binary compound from the molten solvent metal and from any excessive non-metal.

The solvent metal, for the best advantage, should be readily removable by distillation. While for the production of the uranium compounds, cadmium, zinc, a cadmium-zinc or a magnesium-zinc alloy can be used as the solvent metal, zinc, magnesium and magnesium-zinc alloys are preferred for plutonium. In the case of the carbides of uranium and plutonium, their isolation is comparatively simple, because these carbides are not soluble in the solvent metals contemplated and thus precipitate as they are formed. For the coprecipitation of a mixture of uranium and plutonium carbides, which has utility as fuel for nuclear reactors, a magnesium-zinc alloy is the best suitable solvent metal. In case a sulfide is to be prepared, magnesium is best chosen as the solvent metal, because magnesium sulfide is not stable at the high operating temperatures.

The actinide and lanthanide metals, when dissolved in the molten solvent metals, are more reactive on account of the increased surface area, so to speak, than are the molten metals per se; in solution, they react in a relatively short time and at a relatively low temperature with the nonmetal. The solvent metals contemplated for this invention do not react with carbon or the other nonmetals. Also, the actinide carbides, as mentioned, are not soluble in the solvent metals, but precipitate out as formed; by this, they are removed from the reaction immediately when they are formed and a formation of a higher carbide cannot take place. While the uranium precipitates as the monocarbide, the plutonium precipitate obtained was found to correspond to the formula $Pu_2C_3$.

The process can be carried out satisfactorily in a crucible of alumina on account of the relatively low reaction temperature required; many other container materials known in the art, however, are also suitable. In the case of cadmium as the solvent metal and uranium as the metal, the quantity of uranium dissolved is about 2% by weight. As the dissolved uranium reacts with the carbon and precipitates as the carbide, further uranium quantities are dissolved so that the reaction takes place continuously as long as there is enough metal and nonmetal present.

The carbon was mostly introduced as a finely divided activated carbon. It can also be formed in situ, though, by bubbling a gaseous hydrocarbon, e.g. methane, through the molten metal whereby it is decomposed under the effect of the elevated temperature. Similarly, gaseous heat-decomposable sulfur compounds can be used instead of sulfur powder when lanthanide or actinide sulfides are to be prepared; for instance, hydrogen sulfide is suitable for this purpose. In the case of the use of solid carbon, sulfur, etc., stoichiometric amounts of the nonmetal can be added in order to avoid the presence of nonreacted nonmetal after the reaction. However, this precaution is not necessary, because any excessive carbon, sulfur or the like will float on top of the metal mass and can be separated simply by decantation. When a gaseous hydrocarbon or the like is employed, an excess can be avoided by simply discontinuing introduction when all, or practically all, the metal has been reacted. The process is preferably carried out in an inert atmosphere, for instance in an atmosphere of argon or helium gas.

Instead of starting out with the metal, oxides, such as ore concentrates, can also be used. The uranium oxide, $UO_2$ or $U_3O_8$, plutonium oxide or rare earth oxide is introduced, as in the case of the metal, in the solvent metal. Magnesium or similar reductant metal is then added for the reduction of the oxides; a magnesium addition, for instance, of from 3 to 4% by weight is satisfactory, but higher concentrations can be used if a greater solubility of the metal, e.g. uranium, is desired. This reduction is preferably carried out under a flux, which serves as a vehicle for the oxide of magnesium or other solvent metal formed during the reaction. A suitable flux, for instance, consists of 95 mole percent of an equimolar mixture of magnesium chloride and calcium or lithium chloride plus 5 mole percent of magnesium fluoride; about equal volumes of solvent metal and flux are suitable. After separation of the flux, the nonmetal or heat-decomposable nonmetal compound is introduced into the liquid metal solution while the temperature is maintained at between 500 and 700° C. for cadmium and at from 800 to 850° C. for zinc. Within three hours, practically all of the actinide and/or lanthanide metal present has reacted.

In the following, a few examples are given for the purpose of illustrating the process of this invention.

Example I

Uranium, 14.1 grams, was dissolved in cadmium containing 0.06% by weight of magnesium at 700° C., while an argon atmosphere was maintained; the uranium content as referred to the solvent metal was 1.8% by weight. Thereafter 1.8 grams of powdered activated carbon were added under stirring. After 30 minutes, 97% of the uranium present had precipitated, and after one hour the precipitation was quantitative. The reaction product was allowed to solidify, and the ingot formed was cut in halves lengthwise; it was found that there were three distinct layers, a bottom layer, an intermediate layer of cadmium metal and a top layer of carbon. The bottom layer was separated from the other two layers and subjected to a distillation process at about 700° C. and a pressure of less than 4 mm. Hg to remove any adhering cadmium by volatilization. The remaining compound was examined by X-ray diffraction; all uranium was found to be present as uranium monocarbide.

Other runs carried out with uranium are summarized in the following table.

| Solvent Metal (w/o) | Uranium (g.) | Uranium (w/o) | Carbon (g.) | Carbon (Percent Excess) | Temp. (° C.) | Duration (Hrs.) | Yield (Percent Theor.) |
|---|---|---|---|---|---|---|---|
| Cd—99.94 / Mg—0.06 | 15.6 | 1.9 | 2.0 | 150 | 550 / 700 | 8 / +0.5 | 64 / 80 |
| Cd—99.94 / Mg—0.06 | 16.9 | 2.0 | 0.85 | 0 | 700 | 4 | 73 |
| Zn—95 / Mg—5 | 18.8 | 2.9 | 1.5 | 57 | 800 | 4 | 87 |
| Cd—99.94 / Mg—0.06 | 14.8 | 1.8 | 0.84 | 11 | 700 | 3 | 82 |
| Zn—90.4 / Mg—9.6 | 104.5 | 17.3 | 8.04 | 52 | 850 | 3 / 3.5 | 91 / 100 |

The product of the last experiment of the table was heated in a retort at a temperature between 660 and 700° C. and a pressure of from 5 to 0.1 mm. Hg to volatilize zinc and magnesium. A powder was obtained, 90% of which had a particle size of between 5 and 15 microns; its carbon content was 5.02%. The powder was analyzed by X-ray diffraction and found to be a carbide of the formula UC; no $UC_2$ could be detected. This product was very pyrophoric, but it could be sintered in an inert atmosphere by arc welding. The sintered button was polished and again identified by X-ray diffraction as UC. Its density was about 98% of the theoretical density.

The next example demonstrates the preparation of plutonium carbide.

Example II

Seven grams of plutonium were dissolved in 80 grams of magnesium at 810° C. in a baffled alumina vessel, and to the solution formed there were added 1½ grams of activated high-purity carbon. The carbon had a particle size of less than 230 mesh; it was dried in the first part of the run while the temperature was brought up to 100° C. and the pressure was reduced. The mixture was maintained at the temperature at 810° C. and agitated, and an argon atmosphere was provided. After five hours, a filtered sample of the magnesium metal was taken and analyzed. It was found that over 99.8% of the plutonium present had been removed and had thus been precipitated as the carbide. Unreacted, excess, carbon floated on top of the metal layer and could be easily removed by pouring it off.

The solidified ingot was retorted at about 700° C. and the pressure was reduced to from 4 to 1 mm. Hg for the volatilization of adhering magnesium. The product obtained after this distillation step was a loose powder. It was analyzed by X-ray diffraction and found to have a very well-defined pattern corresponding to $Pu_2C_3$; this composition was confirmed by chemical analysis.

Example III

Uranium silicide was prepared by dissolving 10.51 grams of uranium in a molten alloy consisting of 702.4 grams of cadmium and 0.71 gram of magnesium. The alloy had a temperature of 550° C. After 5½ hours all of the uranium was dissolved. The mixture was then heated to 700° C. and 5.25 grams of powdered silicon were added. The reaction mass was stirred for five hours at the temperature of 700° C. After 45 minutes a filtered sample was taken and analyzed; it was found to contain negligibly low amounts of uranium, which indicated a precipitation of most uranium as uranium silicide.

After the five hours the mass was allowed to cool for solidification, and a pie section of the ingot obtained was liquated for 2½ hours. Radioactivity measurements provided that the bulk of the uranium had settled to the bottom. The lower half was retorted under reduced pressure, and X-ray diffraction analysis showed the residual material to have a cubic lattice structure with the dimension of 4.037 A. for $a_0$. This indicates the formula $USi_3$. This compound with the high silicon content could be expected because of the relatively large excess of silicon that was used and the fact that both uranium and silicon are quite soluble in cadmium at 700° C.

However, for the purpose of fuel for nuclear reactors, a higher uranium concentration and therefore a lower silicon content are desirable, because then the necessary fissionable material can be restricted to a smaller volume. Therefore stoichiometric amounts of silicon should be used so that silicides of the formula $U_3Si$ or $U_3Si_2$ are obtained rather than the above $USi_3$. This is shown in Example IV.

Example IV

Silicon powder, 2.35 grams, was dissolved in a molten mixture of 21.93 grams of magnesium and 227.80 grams of zinc. Another solution was prepared by dissolving 30.00 grams of uranium in 22.16 grams of magnesium and 224.8 grams of zinc. Both solutions were prepared at a temperature of about 800° C. The two solutions were combined and maintained at a temperature of 830° C. for five hours when all of the uranium had precipitated as the silicide; this was determined by taking filtered samples of the melted alloy at various intervals and analyzing them for uranium. After the five hours the mixture was subjected to a distillation process by heating to 680° C. at an absolute pressure of about 0.5 mm. Hg, whereby the zinc and the magnesium were volatilized and pure $U_3Si_2$ remained. The composition of the $U_3Si_2$ was identified by X-ray diffraction and confirmed by chemical analysis.

*Example V*

In a magnesium-zinc alloy consisting of 50.8 grams of magnesium and 515.0 grams of zinc, 29.8 grams of uranium were dissolved at a temperature of 800° C. To the uranium solution formed 5.51 grams of finely powdered amorphous boron were added, and the mixture was agitated for several hours while the temperature was maintained at 800° C. At various intervals filtered samples of the metal solution were taken; after four hours the solution was found to be free from uranium, which indicated complete reaction and precipitation of the uranium as boride.

The entire reaction mass was cooled for solidification, and the nonreacted boron powder in the top layer was removed by cropping. The remainder of the reaction mass was retorted, under the conditions described in Example IV, to volatilize the magnesium and zinc. X-ray diffraction indicated that the residue consisted practically completely of $UB_2$ with low quantities of $UB_4$ being present. This "contamination" probably was caused by the use of a 100% excess of boron with respect to the desired product, $UB_2$.

As has been mentioned before, the uranium boride is useful as a fuel material that at the same time contains burnable control material or "poison"; these borides are particularly useful, on account of their great heat resistance, for nuclear reactors that operate at high temperature. A corresponding composition, but containing $B^{11}$ instead of the natural boron, is suitable as a refractory fuel material; it does not function as a control material, because $B^{11}$ has a very low thermal-neutron-capture cross section.

*Example VI*

A solution containing 21.5% by weight of cerium in magnesium metal was reacted at 695° C. with finely divided carbon powder for 3½ hours. A precipitate formed which was separated and analyzed. It was found to be $Ce_2C_3$.

The preparation of $Ce_2C_3$ from a cadmium solution of cerium was unsuccessful. The cerium content in the cadmium remained at the initial level of 1.6% for six hours at 690° C. when finely divided carbon (90% excess) was added.

It was found that plutonium reacted considerably faster with carbon in magnesium metal at 810° C. than do the lanthanides. Plutonium, for instance, had reacted quantitatively in about three hours, while in another analogous run with cerium only about 35% of the cerium present had been converted to the carbide within the same period of time. In two hours about 75% of the plutonium had been converted to the carbide, while only 25% of the cerium had reacted with the carbon. These facts can be utilized for a separation process of plutonium from lanthanide rare earth fission products. A repetition of this carbide reaction with the metal phase obtained, after separation of the carbide, will bring about further separation.

The process of this invention also lends itself very well to the processing, for regeneration, of partially spent binary uranium and/or plutonium compound fuel after it was neutron-bombarded in a nuclear reactor. For this purpose the fuel, say of uranium and/or plutonium carbide, is first oxidized with air or oxygen at a temperature of between 300 and 700° C. The oxidized fuel is then extracted with molten zinc metal in the presence of a molten sodium chloride-magnesium chloride or similar flux for the removal of noble metal fission products, such as ruthenium, rhodium, molybdenum and palladium. The molten salt containing the uranium and plutonium oxides is separated from the zinc phase and is then contacted with magnesium or magnesium-zinc alloy to reduce the oxide to metal. The reaction mass is cooled to precipitate the uranium and/or plutonium in elemental form or as intermetallic compounds, as the case may be. These precipitated metals are separated from any excess metal and the flux which contains most of the fission products and the magnesium oxide formed during reduction.

The uranium and/or plutonium metal is then dissolved in magnesium-zinc and precipitated by the addition of carbon or the like according to the process of this invention. The precipitated carbide is separated from the supernatant molten mass by decantation and retorted for volatilization of adhering magnesium and zinc. Pure uranium and/or plutonium carbide is thus obtained in the form of a loose powder which, after sintering, is ready for reuse as fuel in a reactor.

It will be understood that this invention is not to be limited to the details given herein but that it may be modified within the scope of the appended claims.

What is claimed is:

1. A process of producing uranium monocarbide, comprising dissolving uranium in a molten solvent metal selected from the group consisting of cadmium, zinc, cadmium-zinc, magnesium-zinc and magnesium-cadmium at between 500 and 850° C.; introducing finely divided carbon into the molten uranium solution formed, whereby uranium monocarbide is formed and precipitated; and separating the uranium monocarbide from the molten metal and any excess carbon.

2. The process of claim 1 wherein the carbon is formed in situ by introducing a gaseous hydrocarbon that decomposes at the temperature employed.

3. The process of claim 2 wherein the hydrocarbon is methane.

4. The process of claim 1 wherein the reaction is carried out in an inert atmosphere and under stirring.

5. The process of claim 4 wherein the inert atmosphere is argon gas.

6. A process of producing pure uranium monocarbide, comprising dissolving uranium metal in molten cadmium at between 500 and 700° C.; introducing finely divided carbon into the uranium-cadmium solution whereby uranium monocarbide precipitates; separating the uranium monocarbide from the cadmium metal and any excessive carbon; and heating the uranium monocarbide to about 700° C. under reduced pressure whereby any adhering cadmium metal is volatilized and pure uranium monocarbide is obtained.

7. A process of producing pure uranium monocarbide, comprising dissolving uranium metal in molten zinc at about 800° C.; introducing finely divided carbon into the uranium-zinc solution whereby uranium monocarbide precipitates; separating the uranium monocarbide from the zinc metal and excessive carbon; and heating the uranium monocarbide to about 700° C. under reduced pressure whereby any adhering zinc metal is volatilized and pure uranium monocarbide is obtained.

References Cited in the file of this patent

UNITED STATES PATENTS

| | | |
|---|---|---|
| 2,113,354 | McKenna | Apr. 5, 1938 |
| 2,124,509 | McKenna | July 19, 1938 |